(12) United States Patent
Cuva

(10) Patent No.: US 7,188,477 B2
(45) Date of Patent: Mar. 13, 2007

(54) HIGH TEMPERATURE DYNAMIC SEAL FOR SCRAMJET VARIABLE GEOMETRY

(75) Inventor: William J. Cuva, Jupiter, FL (US)

(73) Assignee: United Technologies Corporation, Hartford, CT (US)

(*) Notice: Subject to any disclaimer, the term of this patent is extended or adjusted under 35 U.S.C. 154(b) by 45 days.

(21) Appl. No.: 10/830,272

(22) Filed: Apr. 21, 2004

(65) Prior Publication Data
US 2005/0235630 A1 Oct. 27, 2005

(51) Int. Cl.
*F02K 7/08* (2006.01)
*F02K 7/10* (2006.01)

(52) U.S. Cl. ............... 60/768; 277/434; 277/437

(58) Field of Classification Search .......... 60/768, 60/771, 230, 271, 266, 39.66; 239/265.33, 239/265.35, 265.37, 265.39, 265.19, 265.41, 239/265.43; 277/434, 437, 630, 637, 640, 277/644, 650–652, 654, 910
See application file for complete search history.

(56) References Cited

U.S. PATENT DOCUMENTS

| | | | | |
|---|---|---|---|---|
| 3,578,764 A | * | 5/1971 | Nunnally et al. ............... 87/6 |
| 3,846,608 A | * | 11/1974 | Valles ...................... 219/741 |
| 3,897,957 A | * | 8/1975 | Warner ..................... 277/373 |
| 3,972,475 A | * | 8/1976 | Nelson et al. ............ 239/127.3 |
| 4,093,157 A | * | 6/1978 | Cavanagh et al. ......... 244/53 R |
| 4,098,076 A | * | 7/1978 | Young et al. ................. 60/230 |
| 4,110,972 A | * | 9/1978 | Young et al. ................. 60/230 |
| 4,121,845 A | * | 10/1978 | Reynolds et al. ........... 277/634 |
| 4,441,726 A | * | 4/1984 | Uhl ............................ 277/652 |
| 4,575,099 A | * | 3/1986 | Nash ......................... 277/345 |
| 4,690,329 A | * | 9/1987 | Madden ................. 239/265.19 |
| 4,747,542 A | * | 5/1988 | Cires et al. ............. 239/127.3 |
| 4,747,543 A | * | 5/1988 | Madden ................... 239/127.3 |
| 4,753,392 A | * | 6/1988 | Thayer et al. ......... 239/265.29 |
| 4,778,109 A | * | 10/1988 | Jourdain et al. ....... 239/265.27 |
| 4,878,618 A | * | 11/1989 | Hufnagel ............... 239/265.39 |
| 4,922,949 A | * | 5/1990 | Mizukusa et al. .......... 251/309 |
| 4,934,600 A | * | 6/1990 | Nash et al. ............. 239/127.1 |
| 4,978,071 A | * | 12/1990 | MacLean et al. ...... 239/265.19 |
| 4,986,033 A | * | 1/1991 | Weil ......................... 49/492.1 |
| 4,998,739 A | * | 3/1991 | Weiler ....................... 277/422 |
| 5,014,917 A | * | 5/1991 | Sirocky et al. ........ 239/265.11 |
| 5,066,028 A | * | 11/1991 | Weil ......................... 277/640 |
| 5,092,525 A | * | 3/1992 | Roach et al. .......... 239/265.29 |
| 5,107,623 A | * | 4/1992 | Weil ......................... 277/637 |
| 5,143,292 A | * | 9/1992 | Corsmeier et al. ....... 239/127.3 |
| 5,181,691 A | * | 1/1993 | Taniguchi et al. ..... 251/315.04 |
| 5,232,158 A | * | 8/1993 | Barcza .................. 239/265.35 |
| 5,251,917 A | * | 10/1993 | Chee et al. ................. 277/645 |
| 5,269,467 A | * | 12/1993 | Williams et al. ....... 239/265.41 |
| 5,285,637 A | * | 2/1994 | Barcza .................. 239/265.35 |
| 5,301,595 A | * | 4/1994 | Kessie ............................ 87/6 |
| 5,358,262 A | * | 10/1994 | Roberts ..................... 277/652 |
| 5,515,914 A | * | 5/1996 | Lashbrook et al. ......... 165/178 |

(Continued)

*Primary Examiner*—William H. Rodriguez
(74) *Attorney, Agent, or Firm*—Bachman & LaPointe

(57) ABSTRACT

A seal assembly for use in an engine, such as a scramjet engine, having a movable element, such as inlet cowl flap, is provided. The movable element has an outboard structural member which requires thermal protection. The seal assembly includes a sealing element and a support block for thermally isolating the outboard structural member and for supporting the sealing element. In a preferred embodiment, the sealing element comprises a rope seal having a tadpole construction.

19 Claims, 2 Drawing Sheets

U.S. PATENT DOCUMENTS

| | | | | |
|---|---|---|---|---|
| 5,630,700 | A * | 5/1997 | Olsen et al. | 415/134 |
| 5,672,812 | A * | 9/1997 | Meyer | 73/35.07 |
| 5,727,382 | A * | 3/1998 | Chevalier et al. | 60/768 |
| 5,915,698 | A * | 6/1999 | James | 277/637 |
| 5,975,535 | A * | 11/1999 | Gail et al. | 277/355 |
| 6,428,057 | B1 * | 8/2002 | Reise | 292/32 |
| 6,435,475 | B1 * | 8/2002 | Blume | 251/318 |
| 6,446,979 | B1 * | 9/2002 | Steinetz et al. | 277/630 |
| 6,568,687 | B2 * | 5/2003 | Radosav | 277/389 |
| 6,609,886 | B2 * | 8/2003 | Aksit et al. | 415/191 |
| 6,655,913 | B2 * | 12/2003 | Vedantam et al. | 415/214.1 |
| 6,715,293 | B2 * | 4/2004 | Sillence et al. | 60/768 |
| 6,719,295 | B2 * | 4/2004 | Mohammed-Fakir et al. | 277/411 |
| 6,837,205 | B1 * | 1/2005 | Chipperfield | 123/193.6 |
| 6,921,086 | B2 * | 7/2005 | Selby | 277/609 |
| 2002/0036241 | A1 * | 3/2002 | Johnson | 239/265.33 |
| 2002/0084598 | A1 * | 7/2002 | Bouloy et al. | 277/637 |
| 2003/0080519 | A1 * | 5/2003 | Kerchner | 277/637 |
| 2003/0182928 | A1 * | 10/2003 | Sillence et al. | 60/266 |

* cited by examiner

HIGH TEMPERATURE DYNAMIC SEAL FOR SCRAMJET VARIABLE GEOMETRY

STATEMENT OF GOVERNMENT INTEREST

The Government of the United States of America may have rights in the present invention as a result of Contract No. F33615-96-C-2694 awarded by the U.S. Department of the Air Force.

BACKGROUND OF THE INVENTION (1) Field of the Invention

The present invention relates to a high temperature dynamic seal for scramjet engines at the interface between fixed and movable engine hardware.

(2) Prior Art

As supersonic combustion ram jet (scramjet) technology continues to develop, an important goal will be to improve the propulsion system's operability and performance. One method of achieving this goal is to incorporate variable geometry into the engine flowpath design. Variable geometry allows for real time optimization of the engine flowpath lines for varying flight conditions. Incorporating a movable cowl inlet flap is one method of achieving variable geometry in a scramjet engine.

There are many challenges associated with incorporating variable geometry in a scramjet environment. Sealing at the interface between the fixed and movable hardware is one of these challenges. The combination of extreme thermal environment and the pressure differential across this joint makes the seal design solution difficult to identify. The sealing solution must limit overboard leakage of the working fluid (in this case, compressed air) from the engine flowpath so as not to degrade engine performance or cause thermal distress in neighboring hardware. It must accomplish this task in an extremely hostile thermal environment while accommodating the travel of the flap. Local thermal and mechanical distortion in the surrounding hardware must also be accounted for.

SUMMARY OF THE INVENTION

Accordingly, it is an object of the present invention to provide an improved seal design for use in a scramjet engine.

It is a further object of the present invention to provide a seal design which can be used where high temperature tolerant sealing is required.

The foregoing objects are attained by the seal design of the present invention.

In accordance with the present invention, a seal assembly for use in an engine with a movable element and an outboard structural member is provided. The seal assembly broadly comprises a sealing element and means for thermally isolating the outboard structural member and for supporting the sealing element. In a preferred embodiment of the present invention, the sealing element comprises a rope seal having a tail retention feature.

Also, in accordance with the present invention, an engine broadly comprises a movable element, which movable element has a pair of sides and a cavity in each of the sides. The engine further has a seal assembly adjacent each of the sides. Each seal assembly comprises a support block which fits into the cavity and a sealing member supported by the support block. In a preferred embodiment, the engine comprises a scramjet engine and the movable element is a movable cowl inlet flap.

Other details of the high temperature dynamic seal for scramjet variable geometry, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
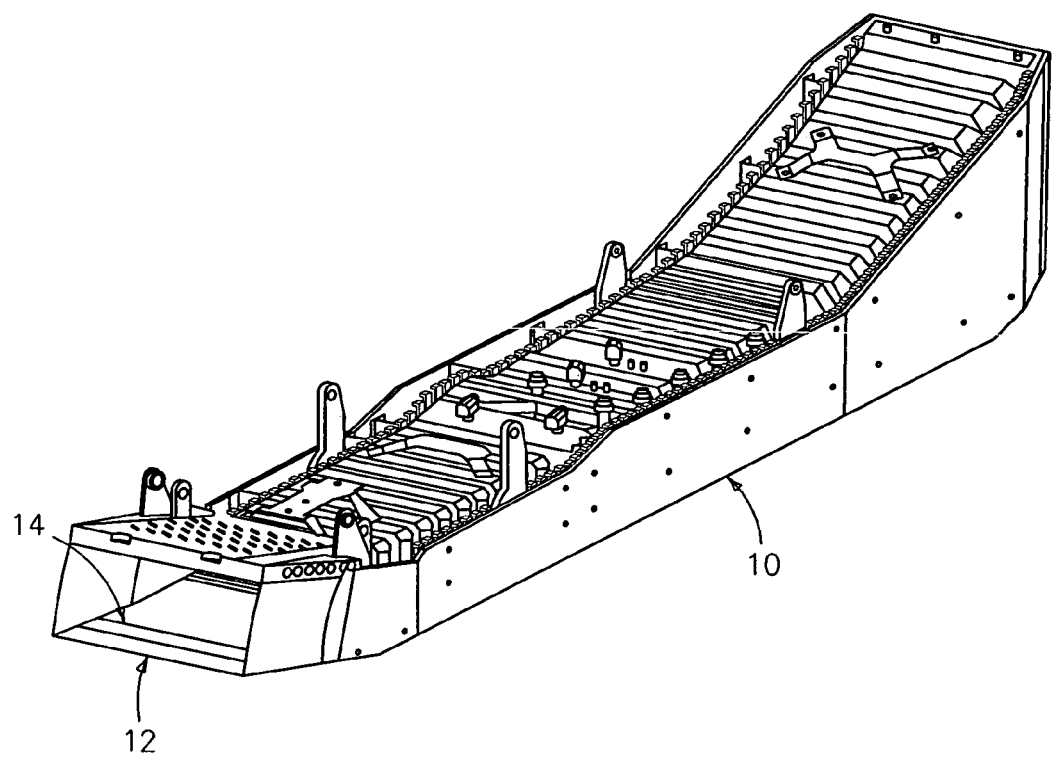
FIG. 1 is a perspective view of a scramjet engine having a movable cowl inlet flap.

Referring now to the drawings, FIG. 1 illustrates a scramjet engine 10 having a movable cowl inlet flap 12. The seal assembly of the present invention is intended to prevent gas leakage at the interface 14 between the movable cowl inlet flap 12 and the fixed engine hardware.

Figure 2:
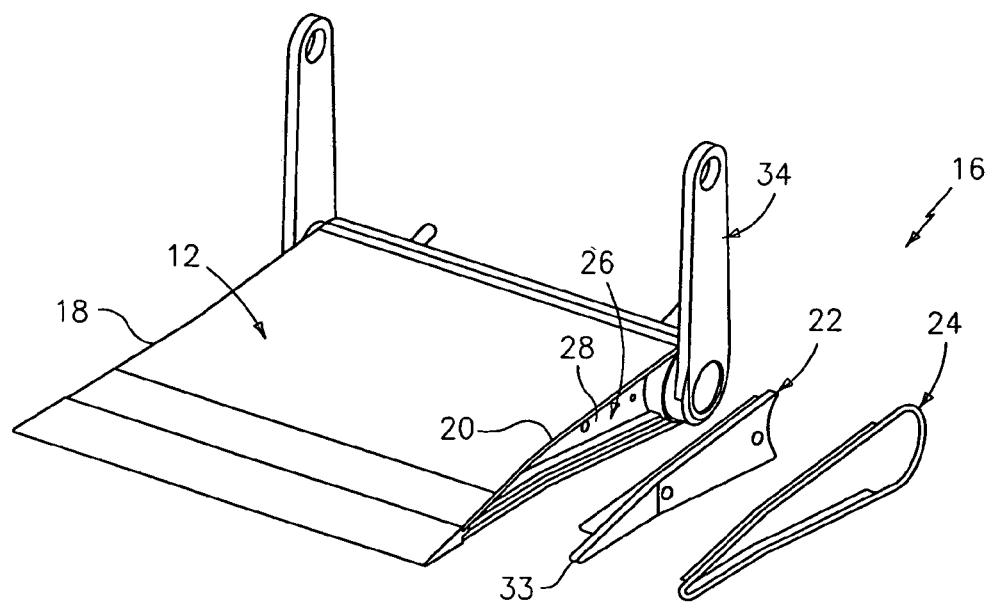
FIG. 2 is an exploded view of an cowl inlet flap and a seal assembly in accordance with the present invention.
Figure 4:
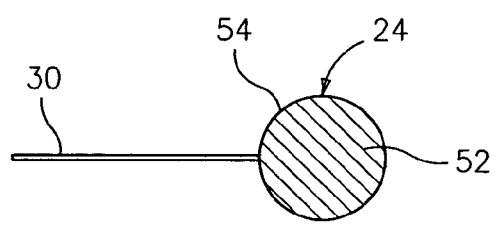
FIG. 4 is a cross sectional view of a rope seal element used in the seal assembly of the present invention.

Referring now to FIG. 2, the movable cowl inlet flap 12 is provided with a sealing assembly 16 on each of the sides 18 and 20. Each sealing assembly 16 includes a seal support block 22 and a rope seal 24. The rope seal 24 preferably has a tadpole construction (as shown in FIG. 4) and may be formed from a high temperature tolerant material such as NEXTEL cloth. The flap's outboard structural member, or stinger, 26 is constructed with a side cavity 28. The side cavity 28 houses the seal support block 22. Two small threaded fasteners (not shown) may be used to retain the block 22 during flap installation and handling. The rope seal 24 runs along the side perimeter of the flap 12 and is held in place using the tail feature 30 on the rope seal 24 (see FIG. 5).

The support block 22 may be constructed of a high temperature capable insulating material such as a ceramic matrix composite material or a monolithic ceramic material. The ceramic matrix composite material may be a composite material having NEXTEL fibers in an aluminosilicate matrix. The monolithic ceramic material may be zirconia. The monolithic ceramic material may be fully dense or partially dense. The support block 22 provides two primary functions. First, it assists in retaining and supporting the rope seal 24. Second, it acts as a thermal insulator to the flap's outboard stringer 26. This important function prevents compromising the structural integrity of the flap's primary support structure due to thermal distress.

The rope seal 24 is preferably constructed in a hoop and installs along the border of the support block 22, wrapping around the nose 33 of the support block 22 and around the torque arm 34 of the flap 12. When the flap 12 is installed on the engine, the rope seal 24 is compressed between the flap's internal and external heat exchange panels 36 and 38, respectively, and the engine sidewall 40 to approximately 80% of its nominal diameter. The rope seal 24 is responsible for retarding leakage outboard or inboard from the engine flowpath.

Figure 3:
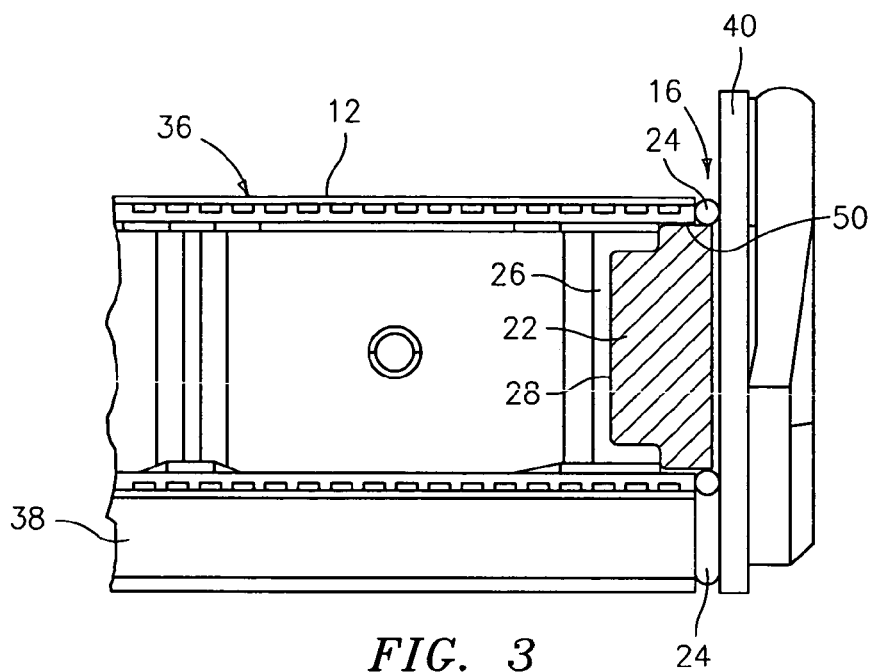
FIG. 3 is a sectional view of the seal assembly of the present invention.

Referring now to FIG. 3, the seal assembly 16 is shown installed onto the flap 12. Also, the flap 12 is shown installed next to the engine sidewall 40. The seal support block 22 can be seen inserted into the cavity 28 of the outboard stringer 26. The rope seal 24 is sandwiched between the internal heat exchange panel 36 and the external heat exchange panel 38 and the engine sidewall 40. It can be seen from this figure that any leakage past the rope seal 24 is contained between the actively cooled engine sidewall 40 and the seal support block 22. This assembly thus effectively isolates the outboard stringer 26 from any hot gases leaking past the rope seal 24.

As shown in FIG. 3, the support block 22 extends out past the edge of the heat exchanger panels 36 and 38, thus supporting the rope seal 24 by forming a shelf 50 for the rope seal 24 to rest on. This extension also helps to minimize the gap between the outboard edge of the flap heat exchange panels 36 and 38 and the engine sidewall 40, thus reducing the size of the leak path. The support block 22 is preferably designed to be sacrificial should it ever come into contact with the engine sidewall 40 during engine operation.

The hoop construction of the rope seal 24 serves two purposes. First, it allows for a more effective double seal configuration. Second, this construction helps retain the rope seal 24 during operation.

As can be seen from FIG. 4, the rope seal 24 gets its "tadpole" name from its cross-sectional shape. The rope seal 24 preferably consists of a semi-dense fiber core 52 with a cloth-like overbraid 54 weaved with an additional length forming a tail like structure 30. The tail 30 is used as a retaining feature. Specifically, when constrained, the tail 30 resists the frictional loads wanting to pull the rope seal 24 out of position when the flap 12 is actuated.

The core 52 of the rope seal 24 is preferably formed from a NEXTEL material due its high temperature tolerance. The overbraid 54 and the tail 30 may be formed from a NEXTEL cloth or a metallic wire cloth material such as a HAYNES 188 wire cloth. Since the overbraid 54 resists the wiping action of the flap 12 against the engine's metallic sidewalls, the material forming the overbraid 54 must exhibit good wear characteristics.

Figure 5:
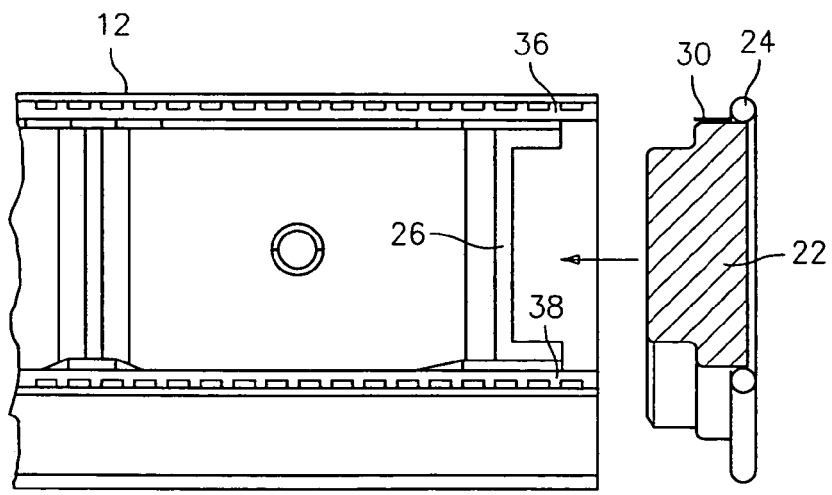
FIG. 5 is a sectional view of a cowl flap having the seal assembly of the present invention.

Referring now to FIG. 5, this figure shows the support block 22 forming the seal support and the rope seal 24 pulled out to the side. This figure demonstrates how the rope seal 24 fits around the support block 22 and how once installed onto the flap 12, the tail 30 is then trapped between the support block 22 and the heat exchanger panels 36 and 38.

As can be seen from the foregoing description, the seal support block 22 acts to (1) support and retain the rope seal 24, (2) thermally protect the non-cooled structure members, (3) reduce the effective leakage gap, and (4) acts as a sacrificial item in the event of incidental contact with the flowpath structure of the engine.

While the seal assembly of the present invention has been described in the context of it being used in a scramjet engine, it could also be used in other types of engines which require high temperature tolerant sealing.

It is apparent that there has been provided in accordance with the present invention a high temperature dynamic seal for scramjet variable geometry which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An engine comprising:
   a movable element;
   said movable element having a pair of sides and a cavity in each of said sides;
   a seal assembly adjacent each of said sides; and
   each said seal assembly comprising a support block which fits into said cavity and a sealing member supported by said support block.

2. An engine comprising:
   a movable element;
   said movable element having a pair of sides and a cavity in each of said sides;
   a seal assembly adjacent each of said sides;
   each said seal assembly comprising a support block which fits into said cavity and a sealing member supported by said support block; and
   said sealing member comprising a rope seal which sits on a shelf portion of said support block.

3. An engine according to claim 2, wherein said rope seal has a tadpole construction.

4. An engine according to claim 2, wherein said rope seal has means for retaining said rope seal in position.

5. An engine according to claim 4, wherein said retaining means comprises a tail on said rope seal.

6. An engine according to claim 2, wherein said rope seal has a fiber core and a cloth like overbraid surrounding said fiber core.

7. An engine comprising:
   a movable element;
   said movable element having a pair of sides and a cavity in each of said sides;
   a seal assembly adjacent each of said sides;
   each said seal assembly comprising a support block which fits into said cavity and a sealing member supported by said support block; and
   said movable element having an inner heat exchange panel and an outer heat exchange panel and an outboard structural member.

8. An engine according to claim 7, further comprising an engine sidewall and said sealing member being sandwiched between said inner and outer heat exchange panels and the engine sidewall.

9. An engine according to claim 7, wherein said support block extends out past edges of said inner and outer heat exchange panels.

10. An engine comprising:
    a movable element;
    said movable element having a pair of sides and a cavity in each of said sides;
    a seal assembly adjacent each of said sides;
    each said seal assembly comprising a support block which fits into said cavity and a sealing member supported by said support block; and
    said support block being formed from an insulating material so as to thermally insulate an outboard structural member of said movable element.

11. An engine comprising:
    a movable element;
    said movable element having a pair of sides and a cavity in each of said sides;
    a seal assembly adjacent each of said sides;

each said seal assembly comprising a support block which fits into said cavity and a sealing member supported by said support block; and said engine being a scramjet engine and said movable element is a movable cowl inlet flap.

12. A seal assembly for use in an engine with a movable element and an outboard structural member, said seal assembly comprising:

a sealing element; and means for thermally isolating said outboard structural member and for supporting said sealing element, said thermally isolating means being formed from a material selected from the group consisting of a ceramic matrix composite material and a monolithic ceramic material.

13. A seal assembly for use in an engine with a movable element and an outboard structural member, said seal assembly comprising:

a sealing element;

means for thermally isolating said outboard structural member and for supporting said sealing element, said thermally isolating and supporting means being formed from a material selected from the group consisting of a ceramic matrix composite material and a monolithic ceramic material; and said sealing element comprising a rope seal which surrounds said thermally isolating and supporting means.

14. A seal assembly for use in an engine with a movable element and an outboard structural member, said seal assembly comprising:

a sealing element;

means for thermally isolating said outboard structural member and for supporting said sealing element, said thermally isolating and supporting means being formed from a material selected from the group consisting of a ceramic matrix composite material and a monolithic ceramic material; and said sealing element comprising a rope seal which surrounds said thermally isolating and supporting means, wherein said rope seal has a tail structure for retaining said rope seal in position.

15. A seal assembly according to claim 14, wherein said rope seal has a fiber core and an overbraid material surrounding said fiber core.

16. A seal assembly according to claim 15, wherein said tail structure is formed from said overbraid material.

17. A seal assembly for use in an engine with a movable element and an outboard structural member, said seal assembly comprising:

a sealing element;

means for thermally isolating said outboard structural member and for supporting said sealing element;

said means for thermally isolating said outboard structural member and for supporting said sealing element comprising a support block formed from an insulating material; and said outboard structural member having a cavity and said support block being sized to fit within said cavity.

18. A seal assembly according to claim 17, wherein said support block has a shelf for supporting said sealing element.

19. A support block for use in a seal assembly to support a rope seal, said support block being formed from an insulating material and having a shelf means for supporting said rope seal, and said insulating material being selected from the group consisting of a ceramic matrix composite material and a monolithic ceramic material.

* * * * *